United States Patent
Cosentino et al.

(10) Patent No.: US 12,386,676 B2
(45) Date of Patent: Aug. 12, 2025

(54) ADJUSTING THE SIZE OF A RESOURCE POOL FOR A VIRTUAL MACHINE BASED ON EVENTS ASSOCIATED WITH THE VIRTUAL MACHINE

(71) Applicant: Red Hat, Inc., Raleigh, NC (US)

(72) Inventors: Andrea Cosentino, Rome (IT); Paolo Antinori, Novara (IT)

(73) Assignee: Red Hat, Inc., Raleigh, NC (US)

( * ) Notice: Subject to any disclaimer, the term of this patent is extended or adjusted under 35 U.S.C. 154(b) by 430 days.

(21) Appl. No.: 17/680,725

(22) Filed: Feb. 25, 2022

(65) Prior Publication Data
US 2023/0273836 A1    Aug. 31, 2023

(51) Int. Cl.
*G06F 9/50* (2006.01)
*G06F 9/455* (2018.01)
(Continued)

(52) U.S. Cl.
CPC ............ *G06F 9/5077* (2013.01); *G06F 9/455* (2013.01); *G06F 9/45533* (2013.01); *G06F 9/45558* (2013.01); *G06F 9/48* (2013.01); *G06F 9/4843* (2013.01); *G06F 9/485* (2013.01); *G06F 9/50* (2013.01); *G06F 9/5061* (2013.01); *G06F 9/5083* (2013.01); *G06F 11/30* (2013.01);
(Continued)

(58) Field of Classification Search
CPC .. G06F 9/455; G06F 9/45533; G06F 9/45558; G06F 2009/4557; G06F 2009/45575; G06F 2009/45583; G06F 2009/45591; G06F 9/48; G06F 9/4843; G06F 9/485; G06F 9/50; G06F 9/5016; G06F 9/5022; G06F 9/5061; G06F 9/5077; G06F 9/5083; G06F 11/30
See application file for complete search history.

(56) References Cited

U.S. PATENT DOCUMENTS 7,725,577 B2    5/2010 Nochta et al.
7,934,028 B1    4/2011 Leonard et al.
(Continued)

FOREIGN PATENT DOCUMENTS

CN    108075989 B    5/2021

OTHER PUBLICATIONS

Rheddane, A.E., et al., "Elastic Message Queues," IEEE International Conference on Cloud Computing, 2014, https://ieeexplore.ieee.org/abstract/document/6973719.

*Primary Examiner* — Charles M Swift
(74) *Attorney, Agent, or Firm* — Kilpatrick Townsend & Stockton LLP

(57) ABSTRACT

Events associated with a virtual machine can be used to adjust an amount of resource objects that may be allocated from a resource pool for the virtual machine. For example, a system can receive a notification including event data indicating an event related to the virtual machine, wherein the virtual machine is configured to rely on resource objects in a resource pool for performing one or more computing operations. The system can determine that the event is a particular type of event. Based on determining that the event is the particular type of event, the system can select a scaling policy corresponding to the particular type of event. The system can then apply the scaling policy to the event data to determine a scaling strategy for adjusting the amount of resource objects.

20 Claims, 5 Drawing Sheets

(51) Int. Cl.
*G06F 9/48* (2006.01)
*G06F 11/30* (2006.01)

(52) U.S. Cl.
CPC .............. *G06F 2009/4557* (2013.01); *G06F 2009/45575* (2013.01); *G06F 2009/45583* (2013.01); *G06F 2009/45591* (2013.01); *G06F 2209/5011* (2013.01)

(56) References Cited

U.S. PATENT DOCUMENTS

| | | |
|---|---|---|
| 9,778,965 B1 | 10/2017 | Leonard |
| 9,847,950 B1 | 12/2017 | Markevics |
| 9,971,621 B1* | 5/2018 | Berg .................... G06F 9/5077 |
| 10,412,779 B2 | 9/2019 | Singh |
| 10,623,433 B1* | 4/2020 | Veselov ............. H04L 63/1433 |
| 2014/0330919 A1 | 11/2014 | Jiang et al. |
| 2016/0103717 A1* | 4/2016 | Dettori .................. G06F 9/5072 |
| | | 719/318 |
| 2017/0024257 A1* | 1/2017 | Cropper ............... G06F 9/5077 |
| 2017/0286148 A1* | 10/2017 | Zou .................... G06F 9/45558 |
| 2019/0155661 A1* | 5/2019 | Aronovich ........... G06F 9/5022 |
| 2020/0250249 A1* | 8/2020 | Fedoryszak ......... G06F 16/9537 |
| 2020/0409806 A1* | 12/2020 | K .......................... G06F 9/5077 |
| 2021/0211391 A1* | 7/2021 | Paraschiv ............ G06F 9/3877 |

\* cited by examiner

ADJUSTING THE SIZE OF A RESOURCE POOL FOR A VIRTUAL MACHINE BASED ON EVENTS ASSOCIATED WITH THE VIRTUAL MACHINE

TECHNICAL FIELD

The present disclosure relates generally to scaling a pool of resource objects usable by virtual machines and other software processes. More specifically, but not by way of limitation, this disclosure relates to adjusting an amount of resource objects that are present in a resource pool used by a virtual machine or another software process based on one or more events occurring on the virtual machine.

BACKGROUND

A virtual machine may be a software emulation of a computer system that can be used for performing computing operations, such as running software applications. The virtual machine may rely on a pool of resource objects, which can be referred to herein as a resource pool, to perform the computing operations. A resource object may be a virtual object (e.g., a message object or a database object) relied up on by the virtual machine to implement some functionality. Each virtual machine may be allocated its own resource pool or may share a resource pool with another virtual machine. The size of the resource pool may impact the operation of the virtual machines that use it.

DETAILED DESCRIPTION

Figure 1:
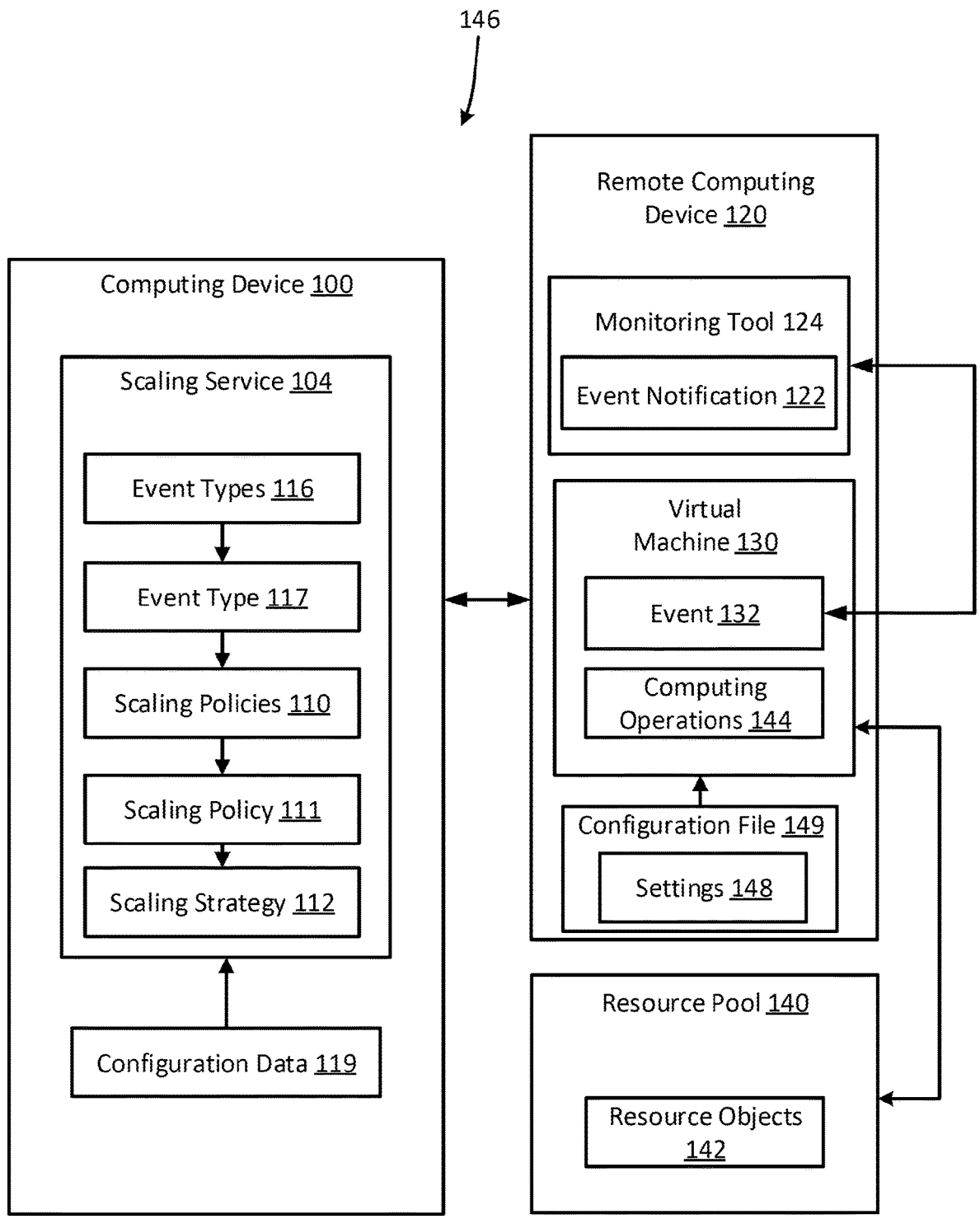
FIG. 1 is a block diagram of an example of a system for adjusting an amount of resource objects in a resource pool in accordance with some aspects of the present disclosure.

A computing environment may execute one or more software processes, such as virtual machines or other Java processes. Each software process may be assigned a resource pool that contains one or more types of resource objects usable by the software process to execute one or more functions. One example of a resource object may be a message object, in which the software process may store a message for transmission to another entity via a messaging service. In the message object example, the resource pool may contain a group of message objects that collectively implement a message pool for queuing messages to be transmitted to and from the software service. Since the resource objects are virtual objects, they can take up space in memory. The size of the resource pool for a given software process can dictate how much memory is consumed by that resource pool. For example, having more resource objects in the resource pool may consume more memory, while having fewer resource objects in the resource pool may consume less memory.

The size of a resource pool is often determined and fixed prior to deployment of the corresponding software process. For example, a human system administrator may manually determine how large a resource pool for a given software process should be based on their experience and judgment. The system administrator may then manually configure a resource pool of the determined size for the software process. But, this manual approach can lead to suboptimal results. For example, if the resource pool is smaller than is required by the software process, it may result in decreased performance of the software process, since the software process may not have enough resource objects to implement its functionality. And if the resource pool is larger than is required by the software process, it may result in wasted memory space, because memory may be allocated to resource objects that are never used by the software process. This may also negatively impact other aspects of the system, which may be unable to use that wasted memory space for other purposes.

Some examples of the present disclosure can overcome one or more of the abovementioned problems by automatically scaling the size of a resource pool for a software process based on events detected in relation to the software process. For example, the resource pool may be scaled to a first size based on a first event. Alternatively, the resource pool may be scaled to a second size based on a second event. More specifically, a system of the present disclosure can receive notifications of events related to the software process. The software process may be coupled to a monitoring tool that can monitor the software process and may provide the system with such notifications. The events can indicate how the software process is making use of the resource pool, along with other characteristics of how the software process is operating. Based on the event data in the notifications, the system can select a scaling policy. For example, if the event data in the notifications indicates a first event of a first event type, the system may select a first scaling policy. Alternatively, if the event data in the notifications indicates a second event of a second event type, the system may select a second scaling policy. The scaling policy can be a set of rules that may determine generally how the resource pool may be scaled based on the event data. For example, the scaling policy may recommend increasing the size of the resource pool upon determining that the event data indicates a first condition. Alternatively, the scaling policy may recommend decreasing the size of the resource pool upon determining that the event data indicates a second condition. The software process can then apply the scaling policy to the event data to determine a scaling strategy. The scaling strategy can specify an adjustment to be made to the resource pool.

Having determined the scaling strategy, the system can adjust an amount of resource objects in the resource pool based on the scaling strategy. For example, the system can scale the amount of resource objects in the resource pool to a first size based on a first scaling strategy. Alternatively, the system can scale the amount of resource objects in the resource pool to a second size based on a second scaling strategy. In this way, the number of resource objects in the resource pool can be tailored (e.g., optimized) based on events associated with the software process, which can indicate how the software process is making use of the resource pool. This may improve the performance of the software process, for example by reducing the number of rejected calls to access unavailable resource objects, which in turn may prevent errors, reduce processor consumption, and reduce network traffic.

In some examples, the software process can be a virtual machine, such as a Java Virtual Machine (JVM) that may be used for running software applications that can be written in Java. The monitoring tool may be a Java Flight Recorder (JFR) monitoring tool, and may be capable of collecting diagnostic data and profiling data from a running software application that may be written in Java. The Java Flight Recorder monitoring tool may be compatible with a Java Flight Recorder Event Service, which may generate real-time notifications of the events that may be occurring in the virtual machine.

In some examples, the system may automatically detect a list of software (e.g., Java) processes that are running at a given point in time in the computing environment. For example, the Java Flight Recorder Event service may determine process IDs for each of the Java processes running in the computing environment and then start a recording process via Java Flight Recorder for each of the Java processes. Each running process may be allocated its own resource pool. For each of the running software processes, the system may deploy a corresponding monitoring tool. The system may receive event data from each monitoring tool and analyze the event data, for example in real time as event notifications are streamed from the monitoring tools. This analysis may involve comparing variable values in the event data to corresponding threshold values. In response to detecting a certain event in relation to a software process, the system can automatically adjust the size of a resource pool associated with that software process. For example, in response to detecting a certain event associated with a software process, the system may automatically increase or decrease the number of message objects that are in a message pool associated with that software process.

In some examples, the size of a resource pool may be fixed and unable to be dynamically adjusted while the corresponding software resource is running. In such circumstances, the system can adjust the size of the resource pool by shutting down the software process, editing a configuration file associated with the software process based on a target size of the resource pool, and re-deploying the software process and the resource pool based on the configuration file. For example, the configuration file may be edited to reflect the target size of the resource pool. This editing may occur while the software process is running. The software process may then be shut down. After shutting down the software process, the software process may be redeployed by the system using the configuration file. Part of this redeployment process may involve the system generating a resource pool of the target size described in the configuration file.

More specifically, a software process may have a corresponding configuration file that includes a setting for controlling the size of the resource pool. So, the system can edit the configuration file to increase or decrease the setting value. The effect of changing the setting value can be that the next time the software process is deployed using the configuration file, the resource pool may also be deployed and sized based on the value of the setting in the configuration file. For example, the size of the resource pool may correspond to the value of the setting in the configuration file. Over time, this process can iterate so that the resource pool can be iteratively adjusted and optimized for a given software process.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 146 for adjusting an amount of resource objects 142 in a resource pool 140 in accordance with a scaling strategy 112. The system 146 can include a computing device 100 that may be coupled to a remote computing device 120. The computing device 100 may be the same as or different from the remote computing device 120, and may include a server, such as a cloud computing server. The computing device 100 may be coupled to the remote computing device 120 over a network, such as a local area network or the Internet. For example, the computing device 100 and the remote computing device 120 may serve as nodes of a distributed computing environment, such as a cloud computing environment or a computing cluster, that can perform jobs on behalf of one or more clients interacting with the distributed computing environment.

In this example, the remote computing device 120 includes a virtual machine 130, though in other examples similar principles may be applied to other types of software processes. The virtual machine 130 may be a software emulation of a computing system, and can be used to perform computing operations 144. In some cases, an event 132 may occur in the virtual machine 130. Examples of the event 132 may include a change in CPU load, a change in a Boolean flag, a change in a value of a variable, a change in a status of a cache, or any other kind of event 132. The event 132 may be a Java Flight Recorder event.

To detect these events, the virtual machine 130 may be coupled to (e.g., include) a monitoring tool 124. The monitoring tool 124 may, in some examples, be a separate software process that may be communicatively coupled to the virtual machine 130. The monitoring tool 124 can receive event notifications 122 corresponding to events 132 associated with (e.g., occurring on) the virtual machine 130. In some examples, the monitoring tool 124 may be a Java Flight Recorder Events Service. Although the monitoring tool 124 is depicted as being on the same physical computer (e.g., remote computing device 120) as the virtual machine 130 in FIG. 1, it will be appreciated that in other examples the monitoring tool 124 may be located elsewhere in the system 146.

In some examples, the system 146 may automatically detect a list of software processes that are running on the remote computing device 120 or elsewhere in the system. The system 146 can save a list of process identifiers (IDs) of the software processes and automatically deploy one or more instances of the monitoring tool 124 for each individual process. Each instance of the monitoring tool 124 can be configured to monitor a corresponding one of the running software processes to detect corresponding events.

The virtual machine 130 may be communicatively coupled with a resource pool 140 that may include resource objects 142 usable for performing computing operations 144 on the virtual machine 130. One example of the resource objects 142 may include a message object for storing messages. Other examples of the resource objects 142 may include root objects, exchange objects, class objects, or any other resource objects 142. The virtual machine 130 may depend on the resource objects 142 to implement certain functionality. Although not explicitly shown for simplicity, the resource objects 142 can be virtual objects stored in one or more memories of the system 146.

The monitoring tool 124 can detect events related to the virtual machine 130 and transmit associated event notifications 122 to a computing device 100. The computing device 100 may execute a scaling service 104, which is software configured to detect the event notifications 122 from one or more monitoring tools 124 and perform one or more operations in response to the event notifications 122. For example, the scaling service 104 can adjust a size of a resource pool 140 relied upon by a virtual machine 130 in response to receiving an event notification 122 from a monitoring tool 124 associated with the virtual machine 130.

In some examples, the scaling service 104 can have access to a list of event types 116 that may correspond to the events 132 that may take place in the virtual machine 130. The list of event types 116 may include a list of possible Java Flight Recorder events. The scaling service 104 may be able to receive an event notification 122 that may correspond to an event 132 in the virtual machine 130.

The scaling service 104 may have access to a list of scaling policies 110 that may be stored on the computing device 100. The scaling service 104 can determine which scaling policy 111 to select from the scaling policies 110 based on the event type 117. For example, the scaling service 104 can ingest or otherwise access configuration data 119 that maps scaling policies 110 to event types 116. The scaling service 104 can use this mapping to determine which scaling policy 111 to select based on the event type 117 of the detected event 132. For example, the scaling service 104 can select a first scaling policy in response to detecting a first event of a first event type. Alternatively, the scaling service 104 can select a second scaling policy in response to detecting a second event of a second event type.

Having selected a scaling policy 111, the scaling service 104 can use the scaling policy 111 to determine a scaling strategy 112. For example, the scaling policy 111 can include logic to which the event data in the event notification 122 can be applied to determine the appropriate scaling strategy 112. The scaling strategy 112 may involve increasing or decreasing the resource pool 140 by a certain amount (e.g., adding or removing X resource objects of a given type from the resource pool 140). Once determined, the scaling strategy 112 may be used for adjusting the number of resource objects 142 in the resource pool 140. Adjusting the resource pool 140 may involve the two computing devices 100, 120 communicating with one another to effectuate the adjustment. For example, the computing device 100 may communicate the adjustment information to the remote computing device 120, which can receive the adjustment information and implement the corresponding adjustment.

In some examples, the amount of resource objects 342 that are to be deployed in a given resource pool 140 may be specified in a configuration file 149. The configuration file 149 can be edited, for example by the scaling service 104 prior to re-deploying the virtual machine 130, to implement an adjustment to the size of the resource pool 140. In some examples, the amount of resource objects can be adjusted by shutting down the virtual machine 130, editing the configuration file 149, and re-deploying the virtual machine 130. The adjustment information may be stored in a setting 148 of the configuration file 149, which may be used by the computing device 100 or the remote computing device 120 to implement the adjustment.

Although FIG. 1 shows a certain number and arrangement of components, this is intended to be illustrative and non-limiting. Other examples may include more components, fewer components, different components, or a different arrangement of the components shown in FIG. 1. For instance, another example may involve multiple software processes. Each software process may have its own resource pool or may share a resource pool with another software process. Each software process can be provided with its own instance of the monitoring tool 124 and/or its own instance of the scaling service 104 for managing its corresponding resource pool. In some cases, multiple software processes may share the same monitoring tool, scaling service, or both of these. For example, the scaling service 104 can serve as a centralized scaling service that governs the size of multiple resource pools for multiple software processes.

Figure 2:
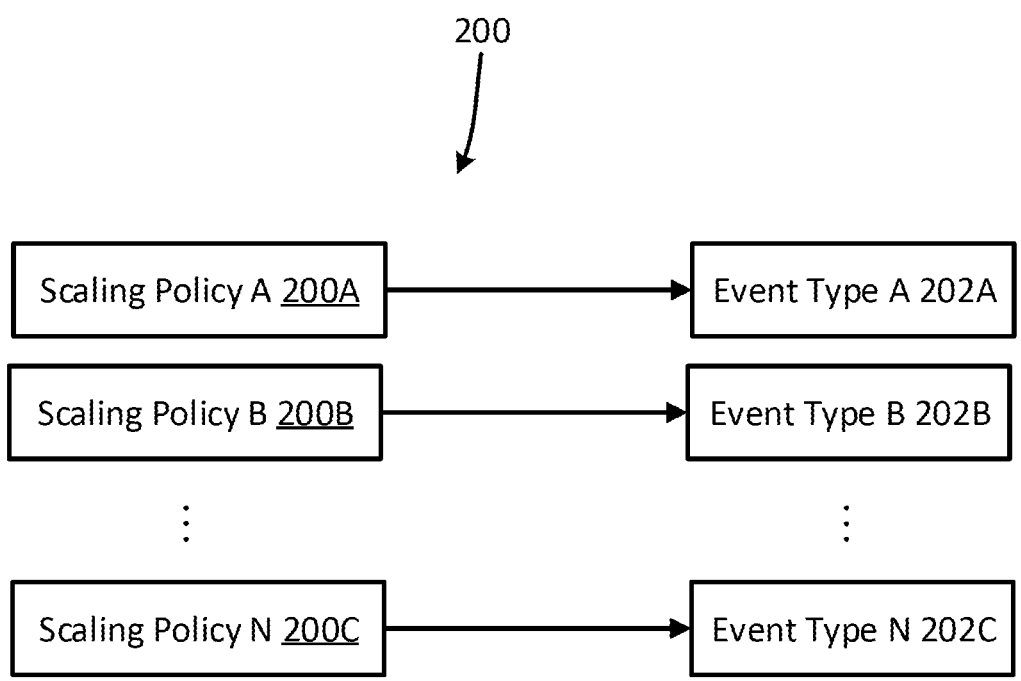
FIG. 2 is a diagram of an example of configuration data in which a set of scaling policies is mapped to event types in accordance with some aspects of the present disclosure.

FIG. 2 is a diagram of an example of configuration data 200 for a scaling service, where the configuration data 200 maps (e.g., correlates) scaling policies 200A-C to event types 202A-C. This configuration data 200 may be similar to the configuration data 119 of FIG. 1. In this example, a first scaling policy A 200A may be used in response to detecting a first event of event type A 202A. A second scaling policy B 200B may be used in response to detecting a second event of second event type B 202B. There may be any number of scaling policies 200A-C that may correspond to any number of event types 202A-C. The event types 202A-C may include a change in CPU load, a change in a Boolean flag, a change in a value of a variable, a change in a status of a cache, or any other type of event. The configuration data 200 may be generated by a system administrator or otherwise supplied to the system (e.g., downloaded via the Internet).

In one example, scaling policy 200C may involve adjusting a message pool size. The scaling service may implement the scaling policy 200C in response to detecting an event type 202C that may correspond to a total memory allocation exceeding a threshold value, which may indicate that the total memory allocation is higher than a desired amount of total memory allocation. To prevent the undesired total memory allocation value, the resource pool may be decreased in size. To implement the adjustment defined in the scaling policy 200C, the system may require the virtual machine to be showdown and then re-deployed. In other examples, the scaling service may implement the scaling policy 200C implemented to dynamically adjust the size of the resource pool while the virtual machine is running (i.e., without shutting down the virtual machine). In some examples, the scaling service may implement the scaling policy 200C to prevent an excessive memory allocation and improve the performance of computing operations that may be running on the virtual machine.

Figure 3:
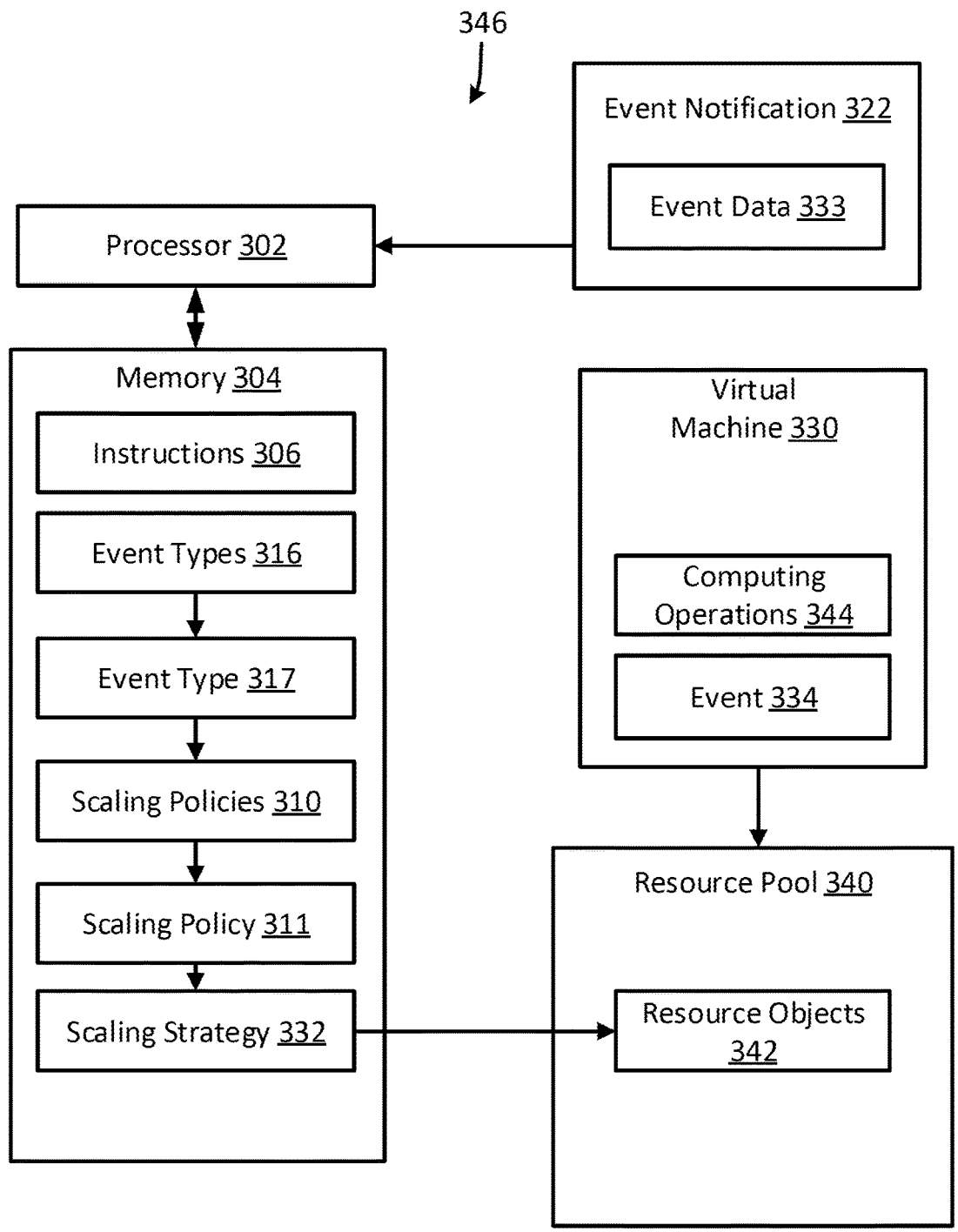
FIG. 3 is a block diagram of another example of a system for adjusting an amount of resource objects in a resource pool in accordance with a scaling strategy.

FIG. 3 is a block diagram of another example of a system 346 for adjusting an amount of resource objects in a resource pool in accordance with some aspects of the present disclosure. The system 346 can include a processor 302 that can be communicatively coupled to a memory 304. The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform one or more operations. In some examples, the instructions 306 can include processor-specific instructions generated by a compiler or an interpreter from code written in any suitable computer-programming language, such as C, C++, C #, etc. In some examples, the instructions 306 can correspond to the scaling service 104 of FIG. 1.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any other type of non-volatile memory. At least some of the memory device can include a computer-readable medium from which the processor 302 can read the instructions 306.

The processor 302 may be configured to receive an event notification 322. The event notification 322 may include event data 333 that may be related to an event 334 associated with a virtual machine 330. The event 334 may be detected and logged to a log file by a monitoring tool. The event 334 may also be analyzed in real time (e.g., as it is being detected and logged) by the monitoring tool, which may issue the event notifications in real time in response to detecting events. The virtual machine 330 may perform computing operations 344 that may make use of resource objects 342 in a resource pool 340. A scaling strategy 332 can be used to adjust the amount of resource objects 342 in the resource pool 340, which can be allocated to the virtual machine 330 for performing computing operations 344.

An event type 317 that may correspond to the event 334 can be determined from a list of event types 316 for determining the scaling strategy 332. Upon determining the event type 317, the processor 302 may select a scaling policy 311 from a list of scaling policies 310. The scaling policy 311 may be contained in a file that can be stored in the memory 304. The scaling policy 311 may include conditional logic for determining an appropriate scaling strategy 332 by evaluating conditions in the conditional logic that may be related to a value of a variable. The scaling policy 311 may dictate the scaling strategy 332 for adjusting the amount of resource objects 342 that can be allocated to the virtual machine 330.

In one specific example, the scaling policy 311 may specify a decrease in an amount of resource objects 342 in the resource pool 340 in response to determining that a total amount of memory allocated to the virtual machine 330 is above a threshold value. This may indicate that too much memory is allocated to the resource pool 340. So, the processor 302 can use the scaling policy 311 to determine a reduced amount of resource objects 342 to employ in the resource pool 340, and effectuate that adjustment.

Figure 4:
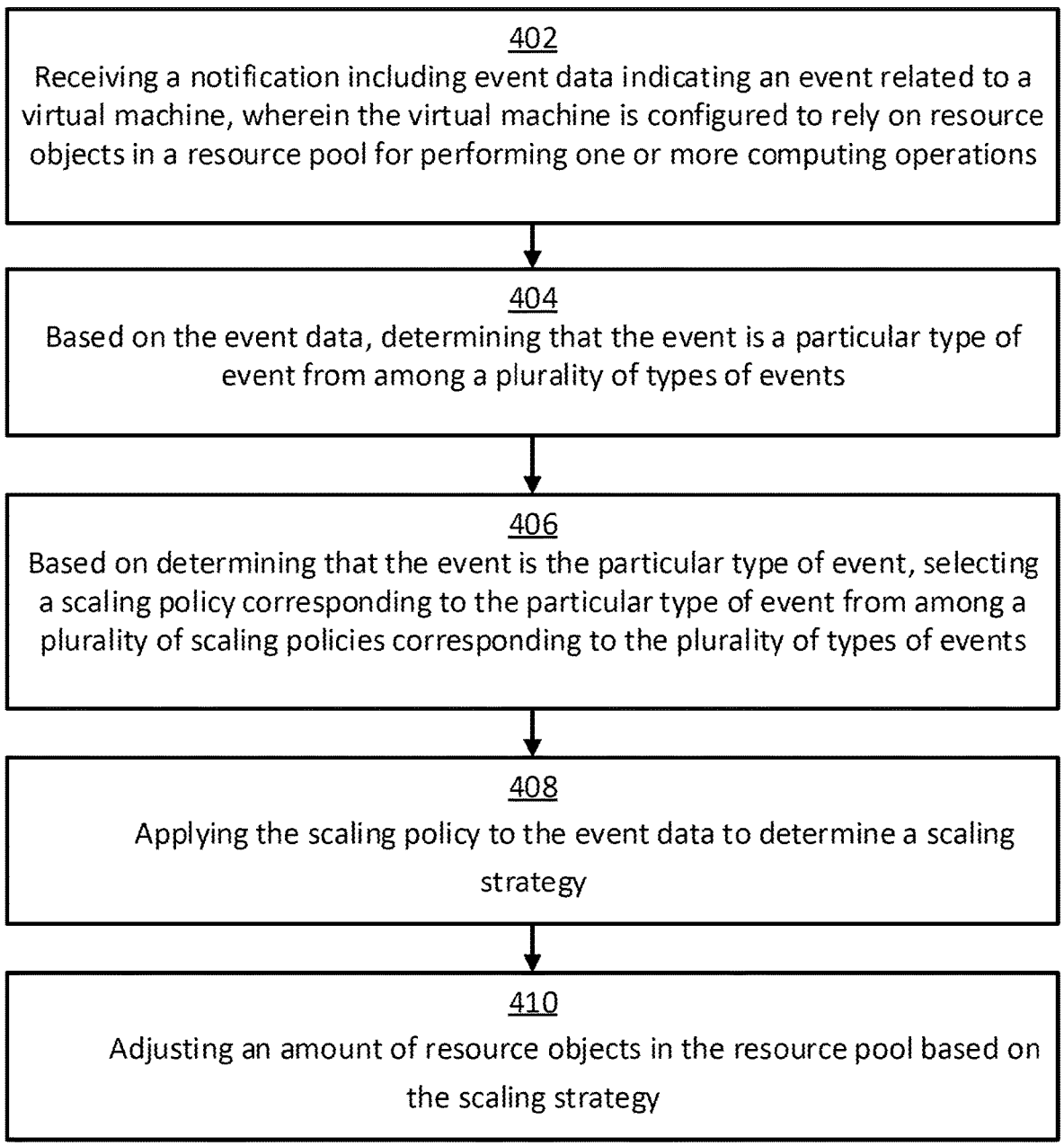
FIG. 4 is a flow chart of an example of a process for adjusting an amount of resource objects in a resource pool in accordance with some aspects of the present disclosure.

FIG. 4 is a flow chart of an example of a process for adjusting an amount of resource objects in a resource pool in accordance with some aspects of the present disclosure. Other examples may include more steps, fewer steps, different steps, or a different order of the steps than is shown in FIG. 4. The steps of FIG. 4 are described below with reference to the components of FIG. 3 described above.

At block 402, a processor 302 receives a notification 322 including event data 333 indicating an event related to a virtual machine 330, wherein the virtual machine 330 is configured to rely on resource objects 342 in a resource pool 340 for performing one or more computing operations 344. The event data 333 may indicate which processes may be running at the time of the event 334. In some examples, the event data 333 may be recorded with Java Flight Recorder, or any other suitable monitoring tool.

At block 404, based on the event data 333, the processor 302 determines that the event 334 is a particular type of event 316 from among a plurality of types of events 317. For example, the processor 302 may determine that the event 334 is a change in a value associated with a virtual machine 330 by evaluating the event data 333. The event 334 may include a change in CPU load, a change in a Boolean flag, a change in a value of a variable, a change in a status of a cache, or any other kind of event 334. In some examples, the event 334 may include a total memory allocation exceeding a desired threshold value.

At block 406, based on determining that the event is the particular type of event, the processor 302 selects a scaling policy 311 corresponding to the particular type of event 317 from among a plurality of scaling policies 310 corresponding to the plurality of types of events 316. Each type of event 316 may correspond to a unique scaling policy 311. The scaling policy 311 may include conditional logic that can be used to determine a scaling strategy 332. For example, the scaling policy 311 may specify increasing the size of a message pool when the total memory allocation satisfies a first condition, or decreasing the size of the message pool when the total memory allocation for the virtual machine 330 satisfies a second condition. The scaling policy 311 may be used to determine the scaling strategy 332, which may involve a specific increase or decrease in the size of the message pool.

At block 408, the processor 302 applies the scaling policy 311 to the event data 333 to determine a scaling strategy 332. The scaling strategy 332 may control how the computing device adjusts an amount of resource objects 342 in the resource pool 340. For example, the scaling strategy 332 may cause the processor 302 to adjust the size of the message pool in a certain way.

At block 410, the processor 302 adjusts the amount of resource objects in the resource pool 340 based on the scaling strategy 332. This results in a change of the message pooling size. In some examples, the amount of resource objects 342 in the resource pool 340 may be adjusted by editing a configuration file, such as configuration file 149 of FIG. 1. The running virtual machine may then be shutdown, redeployed, and reconfigured using the configuration file, which may contain an adjusted value for the resource pooling size. As another example, the processor 302 may adjust the amount of resource objects in the resource pool 340 by editing a memory value. For instance, the processor 302 may update a memory value storing a size of the resource pool 340. A system can detect the updated value and automatically adjust the size of the resource pool 340 based thereon. As yet another example, the processor 302 may adjust the amount of resource objects in the resource pool 340 by transmitting a command to an application programming interface (API). For instance, the processor 302 can transmit a command to an API, where the API is configured to control a size of the resource pool 340 based on the command.

Figure 5:
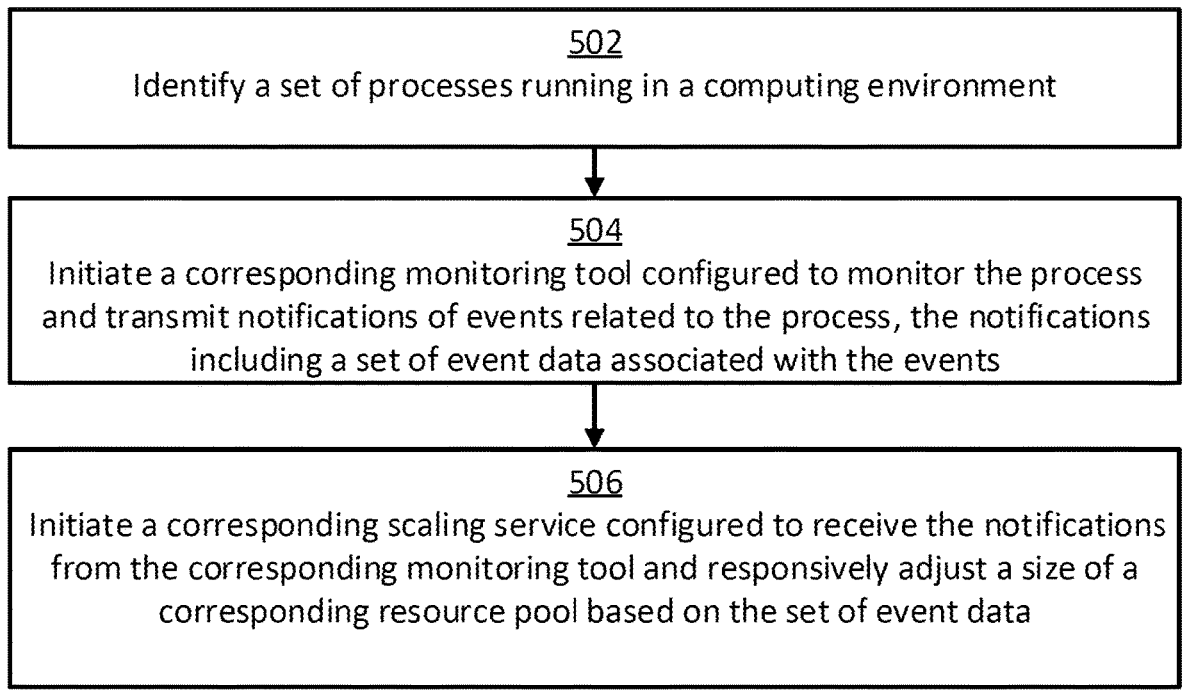
FIG. 5 is a flow chart of an example of a process for automatically identifying running processes and deploying corresponding scaling services in accordance with some aspects of the present disclosure.

FIG. 5 is a flow chart of an example of another process for adjusting an amount of resource objects 142 in a resource pool 140 in accordance with a scaling strategy 112. Other examples may include more steps, fewer steps, different steps, or a different order of the steps than is shown in FIG. 5. The steps of FIG. 5 are described below with reference to the components of FIG. 1 described above.

At block 502 a computing device 100 can identify a set of processes running in a computing environment. In some examples, the computing device 100 may use a Java Flight Recorder Events Service to identify the set of processes. The Java Flight Recorder Events Service may be able to determine a set of process ID values that may correspond to each of the processes running in the computing environment. The computing environment may include one or more computing devices, such as multiple nodes of a computing cluster or data grid. The computing environment may include or exclude the computing device 100.

At block 504, the computing device may, for each process in the set of processes, initiate a corresponding monitoring tool 124 configured to monitor the process and transmit notifications 122 of events 132 related to the process. Each notification 122 can include a set of event data associated with a detected event 132. The monitoring tool 124 may be an instance of a Java Flight Recorder process monitoring tool and may record event data related to Java Flight Recorder events.

At block 506, the computing device may, for each process in the set of processes, initiate a corresponding scaling service 104 configured to receive the notifications 122 from the corresponding monitoring tool 124 and responsively adjust a size of a corresponding resource pool 140 based on the set of event data. The scaling service may include instances of the Java Flight Recorder Events Service, which may be configured to receive the Java Flight Recorder event data and notifications 122 associated with the Java Flight Recorder event data.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by a processor for causing the processor to:
   identify a plurality of software processes running in a computing environment;
   execute a decentralized monitoring and scaling framework by, for each process in the plurality of software processes:
      initiating a corresponding monitoring tool configured to monitor the process and transmit notifications of events related to the process, the notifications including a set of event data associated with the events, wherein the corresponding monitoring tool is dedicated to the process and does not monitor any other process of the plurality of software processes; and
      initiating a corresponding scaling service configured to receive the notifications from the corresponding monitoring tool and responsively adjust a size of a corresponding resource pool based on the set of event data, wherein the corresponding scaling service is dedicated to the process and does not scale any other resource pool for any other process of the plurality of software processes;
   receive a notification including event data indicating an event related to a software process of the plurality of software processes, the software process being configured to rely on resource objects in the corresponding resource pool for the software process for performing a computing operation, wherein the corresponding resource pool is a message pool and the resource objects include message objects for handling messages in the message pool;
   based on the event data, determine that the event is of a particular type among a plurality of types of events;
   based on determining that the event is of the particular type, select a scaling policy corresponding to the particular type;
   apply the scaling policy to the event data to determine a scaling strategy; and
   adjust an amount of resource objects in the corresponding resource pool for the software process based on the scaling strategy.

2. The non-transitory computer-readable medium of claim 1, wherein configuration data specifies relationships between a plurality of predefined scaling strategies and the plurality of types of events, and further comprising program code that is executable by the processor for causing the processor to:
   receive the configuration data; and
   determine a relationship, in the configuration data, between the scaling policy and the particular type of the event; and
   select the scaling policy based on the relationship in the configuration data.

3. The non-transitory computer-readable medium of claim 1, wherein the software process is a Java Virtual Machine (JVM), and wherein a monitoring tool is coupled to the JVM for generating and transmitting the notification in response to detecting the event.

4. The non-transitory computer-readable medium of claim 1, wherein the scaling policy is configured to:
   determine whether a value in the event data is greater than or equal to a predefined threshold value;
   in response to determining that the value is greater than or equal to the predefined threshold value, select a first scaling strategy as the scaling strategy to be implemented; and
   in response to determining that the value is less than the predefined threshold value, select a second scaling strategy as the scaling strategy to be implemented, the second scaling strategy being different from the first scaling strategy.

5. The non-transitory computer-readable medium of claim 1, wherein the corresponding scaling service is configured to:
   compare values in the set of event data to one or more predefined thresholds;
   based on determining that the values are greater than or equal to the one or more predefined thresholds, decrease the size of the corresponding resource pool according to a first scaling policy identified in configuration data; and
   based on determining that the values are less than the one or more predefined thresholds, increase the size of the corresponding resource pool according to a second scaling policy identified in the configuration data.

6. The non-transitory computer-readable medium of claim 1,
   wherein the software process is a virtual machine, and further comprising program code that is executable by the processor for causing the processor to adjust the amount of resource objects in the corresponding resource pool based on the scaling strategy by:
   shutting down the virtual machine;
   adjusting a setting in a configuration file associated with the virtual machine based on the scaling strategy to produce an updated configuration file for the virtual machine, the setting controlling the amount of resource objects in the corresponding resource pool; and
   deploying the virtual machine using the updated configuration file.

7. A method comprising:
   identifying a plurality of software processes running in a computing environment;

executing a decentralized monitoring and scaling framework by, for each process in the plurality of software processes:
  initiating a corresponding monitoring tool configured to monitor the process and transmit notifications of events related to the process, the notifications including a set of event data associated with the events, wherein the corresponding monitoring tool is dedicated to the process and does not monitor any other process of the plurality of software processes; and
  initiating a corresponding scaling service configured to receive the notifications from the corresponding monitoring tool and responsively adjust a size of a corresponding resource pool based on the set of event data, wherein the corresponding scaling service is dedicated to the process and does not scale any other resource pool for any other process of the plurality of software processes;
receiving, by a processor, a notification including event data indicating an event related to a software process of the plurality of software processes, the software process being configured to rely on resource objects in the corresponding resource pool for the software process for performing a computing operation, wherein the corresponding resource pool is a message pool and the resource objects include message objects for handling messages in the message pool;
based on the event data and by the processor, determining that the event is a particular type of event from among a plurality of types of events;
based on determining that the event is the particular type of event and by the processor, selecting a scaling policy corresponding to the particular type of event from among a plurality of scaling policies corresponding to the plurality of types of events;
applying, by the processor, the scaling policy to the event data to determine a scaling strategy; and
adjusting, by the processor, an amount of resource objects in the corresponding resource pool for the software process based on the scaling strategy.

8. The method of claim 7, wherein the plurality of predefined scaling strategies and the plurality of types of events are identified in configuration data, the configuration data including relationships between the plurality of scaling policies and the plurality of types of events, and further comprising:
  receiving, by the processor, the configuration data; and
  determining a relationship, by the processor and in the configuration data, between the scaling policy and the particular type of event; and
  selecting, by the processor, the scaling policy based on the relationship in the configuration data.

9. The method of claim 7, wherein the software process is a Java Virtual Machine (JVM), and wherein a monitoring tool is coupled to the JVM for generating and transmitting the notification in response to detecting the event.

10. The method of claim 7, further comprising:
  determining, by the processor, whether a value in the event data is greater than or equal to a predefined threshold value;
  in response to determining that the value is greater than or equal to the predefined threshold value, selecting, by the processor, a first scaling strategy as the scaling strategy to be implemented; and
  in response to determining that the value is less than the predefined threshold value, selecting, by the processor, a second scaling strategy as the scaling strategy to be implemented, the second scaling strategy being different from the first scaling strategy.

11. The method of claim 7, wherein the corresponding scaling service is configured to:
  compare values in set of event data to one or more predefined thresholds;
  based on determining that the values are greater than or equal to the one or more predefined thresholds, decrease the size of the corresponding resource pool according to a first scaling policy identified in configuration data; and
  based on determining that the values are less than the one or more predefined thresholds, increase the size of the corresponding resource pool according to a second scaling policy identified in the configuration data.

12. The method of claim 7, wherein the software process is a virtual machine, and further comprising adjusting the amount of resource objects in the corresponding resource pool based on the scaling strategy by:
  shutting down, by the processor, the virtual machine;
  adjusting, by the processor, a setting in a configuration file associated with the virtual machine based on the scaling strategy to produce an updated configuration file for the virtual machine, the setting controlling the amount of resource objects in the corresponding resource pool; and
  deploying, by the processor, the virtual machine using the updated configuration file.

13. A system comprising:
  a processor; and
  a memory including instructions that are executable by the processor for causing the processor to:
    identify a plurality of software processes running in a computing environment;
    execute a decentralized monitoring and scaling framework by, for each process in the plurality of software processes:
      initiating a corresponding monitoring tool configured to monitor the process and transmit notifications of events related to the process, the notifications including a set of event data associated with the events, wherein the corresponding monitoring tool is dedicated to the process and does not monitor any other process of the plurality of software processes; and
      initiating a corresponding scaling service configured to receive the notifications from the corresponding monitoring tool and responsively adjust a size of a corresponding resource pool based on the set of event data, wherein the corresponding scaling service is dedicated to the process and does not scale any other resource pool for any other process of the plurality of software processes;
    receive a notification including event data indicating an event related to a software process of the plurality of software processes, the software process being configured to rely on resource objects in the corresponding resource pool for the software process for performing a computing operation, wherein the corresponding resource pool is a message pool and the resource objects include message objects for handling messages in the message pool;
    based on the event data, determine that the event is a particular type of event from among a plurality of types of events;
    based on determining that the event is the particular type of event, select a scaling policy corresponding to the particular type of event from among a plurality of scaling policies corresponding to the plurality of types of events;

apply the scaling policy to the event data to determine a scaling strategy; and adjust an amount of resource objects in the corresponding resource pool for the software process based on the scaling strategy.

14. The system of claim 13, wherein the plurality of predefined scaling strategies and the plurality of types of events are identified in configuration data, the configuration data including relationships between the plurality of scaling policies and the plurality of types of events, and the memory further comprises instructions that are executable by the processor for causing the processor to:

receive the configuration data; and determine a relationship, in the configuration data, between the scaling policy and the particular type of event; and select the scaling policy based on the relationship in the configuration data.

15. The system of claim 13, wherein the software process is a Java Virtual Machine (JVM), and wherein a monitoring tool is coupled to the JVM for generating and transmitting the notification in response to detecting the event.

16. The system of claim 13, wherein the corresponding resource pool for the software process is a dedicated resource pool that is not shared among the plurality of software processes, and wherein each software process of the plurality of software processes has its own dedicated resource pool.

17. The method of claim 7, wherein the corresponding resource pool for the software process is a dedicated resource pool that is not shared among the plurality of software processes, and wherein each software process of the plurality of software processes has its own dedicated resource pool.

18. The system of claim 13, wherein the software process is a virtual machine, and the memory further comprises instructions that are executable by the processor for causing the processor to adjust the amount of resource objects in the corresponding resource pool based on the scaling strategy by:

shutting down the virtual machine;

adjusting a setting in a configuration file associated with the virtual machine based on the scaling strategy to produce an updated configuration file for the virtual machine, the setting controlling the amount of resource objects in the corresponding resource pool; and deploying the virtual machine using the updated configuration file.

19. The system of claim 13, wherein the scaling policy is configured to:

determine whether a value in the event data is greater than or equal to a predefined threshold value;

in response to determining that the value is greater than or equal to the predefined threshold value, select a first scaling strategy as the scaling strategy to be implemented; and in response to determining that the value is less than the predefined threshold value, select a second scaling strategy as the scaling strategy to be implemented, the second scaling strategy being different from the first scaling strategy.

20. The system of claim 13, wherein the corresponding scaling service is configured to:

compare values in the set of event data to one or more predefined thresholds;

based on determining that the values are greater than or equal to the one or more predefined thresholds, decrease the size of the corresponding resource pool according to a first scaling policy identified in configuration data; and based on determining that the values are less than the one or more predefined thresholds, increase the size of the corresponding resource pool according to a second scaling policy identified in the configuration data.

* * * * *